US008793772B2

(12) United States Patent
Doradla et al.

(10) Patent No.: US 8,793,772 B2
(45) Date of Patent: Jul. 29, 2014

(54) WIRELESS LOCAL AREA NETWORK ACCESS CONTROLLED BY CELLULAR COMMUNICATIONS

(75) Inventors: Anil Doradla, Austin, TX (US); Rias Muhamed, Richardson, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1395 days.

(21) Appl. No.: 11/411,121

(22) Filed: Apr. 26, 2006

(65) Prior Publication Data

US 2007/0256135 A1 Nov. 1, 2007

(51) Int. Cl.
*G06F 7/04* (2006.01)
*H04L 29/06* (2006.01)

(52) U.S. Cl.
CPC .................................... *H04L 63/08* (2013.01)
USPC ................................................ 726/5; 726/26

(58) Field of Classification Search
None
See application file for complete search history.

(56) References Cited

U.S. PATENT DOCUMENTS

| 6,920,559 | B1 * | 7/2005 | Nessett et al. | 713/168 |
| 7,346,025 | B2 * | 3/2008 | Bryson | 370/328 |
| 7,395,050 | B2 * | 7/2008 | Tuomi et al. | 455/411 |
| 2002/0157007 | A1 * | 10/2002 | Sashihara | 713/183 |
| 2003/0084287 | A1 * | 5/2003 | Wang et al. | 713/168 |
| 2005/0148321 | A1 | 7/2005 | Igarashi et al. | |
| 2005/0233729 | A1 | 10/2005 | Stojanovski et al. | |

FOREIGN PATENT DOCUMENTS

| CA | 2588919 | 5/2006 |
| WO | 2004/075484 | 9/2004 |
| WO | 2006/055986 | 5/2006 |

OTHER PUBLICATIONS

Canada Office action mailed Jan. 14, 2011.
Lin P et al., "GPRS-based WLAN authentication and auto-configuration", Computer Communications, Elsevier Science Publishers BV, Amsterdam, NL, vol. 27, No. 8, XP004501204, May 1, 2004, pp. 739-742.
Search report from E.P.O., mail date is Jan. 8, 2013.

\* cited by examiner

*Primary Examiner* — Kaveh Abrishamkar
(74) *Attorney, Agent, or Firm* — Greenblum & Bernstein, P.L.C.

(57) ABSTRACT

A computer readable medium stores a program for enabling access to a wireless local area network (WLAN) from a dual mode device. The program enables the dual mode device to detect presence of a WLAN access point. The program also transmits information about the access point and about the dual mode device via a cellular network to a clearinghouse server. A portion of the program receives the information via the cellular network, the information identifying the dual mode device and an access point of a WLAN provider. The program then determines whether the dual mode device has permission to access the access point. When permission exists, the program informs the WLAN provider. The dual mode device accesses the WLAN access point in response to the clearinghouse server approving access.

22 Claims, 3 Drawing Sheets

WIRELESS LOCAL AREA NETWORK ACCESS CONTROLLED BY CELLULAR COMMUNICATIONS

BACKGROUND

1. Field of the Disclosure

The present disclosure relates to wireless communications. More particularly, the present disclosure relates to controlling access to wireless local area networks.

2. Background Information

Recently, wireless local area networks (WLANs), such as Wi-Fi networks and hotspots, have proliferated in the public space. WiFi networks include WLANs conforming to standards such as 802.11. Within the United States, the introduction of the networks has resulted in a fragmented market with several thousand independent Wi-Fi operators providing coverage in different public venues. These venues vary from small deployments, such as restaurants, cafes, and coffee shops, to much larger deployments, such as convention centers, hotels, and airports.

Users interested in connecting to Wi-Fi networks in the public space have to typically either subscribe to the Wi-Fi operator's services on a monthly basis or pay a one-time fee each time they use the hotspot. Such an arrangement is not optimal as it results in paying bills to multiple Wi-Fi operators at the end of each month, increasing the costs of associating with multiple operators, and remembering the login-password combination for hotspots operated by different Wi-Fi operators.

Although clearinghouses exist, a subscriber must still login through an access point, raising security issues. Moreover, an extra relationship must be established. That is, the subscriber must have a relationship with a clearinghouse, in addition to the relationship with the WiFi provider.

There is a need for addressing the issues identified above.

DETAILED DESCRIPTION

Figure 1:
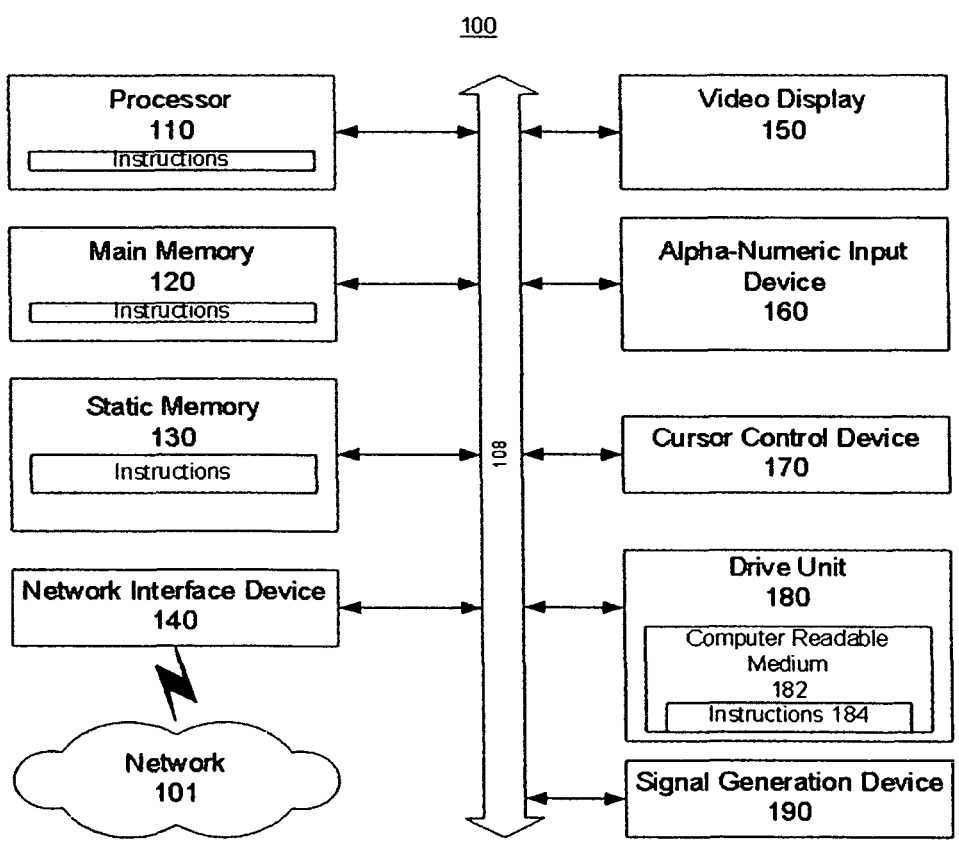
FIG. 1 shows an exemplary general computer system that can operate within the cellular/WLAN system.

In view of the foregoing, the present invention, through one or more of its various aspects, embodiments and/or specific features or sub-components, is thus intended to bring out one or more of the advantages as specifically noted below.

The present disclosure relates to a cellular clearinghouse that allows users to connect to Wi-Fi hotspots owned and operated by multiple Wi-Fi operators without worrying about remembering multiple credentials and receiving multiple bills at the end of the month.

In one aspect of the present invention, a computer readable medium stores a program for enabling access to a wireless local area network (WLAN) from a dual mode device. The program includes a WLAN detecting code segment that detects presence of a WLAN access point, and a transmitting code segment. The transmitting code segment transmits information about the access point and about the dual mode device via a cellular network to a clearinghouse server. The program also includes an access code segment that accesses the WLAN access point in response to the clearinghouse server approving access and forwarding credentials to an operator of the access point.

In one embodiment, the cellular network is a GSM network. The transmission can be via general packet radio service (GPRS) and/or enhanced data rates for GSM evolution (EDGE) and/or universal mobile telecommunications system (UMTS), and/or short message service (SMS). The WLAN can be an 802.11 network.

In another aspect, a computer readable medium stores a program for enabling access to a wireless local area network (WLAN) from a dual mode device. The program includes a receiving code segment that receives a query from the dual mode device via a cellular network, the query identifying the dual mode device and an access point of a WLAN provider. The program also has a verifying code segment that determines whether the dual mode device has permission to access the access point. The program further includes a transmission code segment that informs the WLAN provider when the dual mode device is determined to have permission to access the access point.

The program can also include a billing code segment that receives billing information from the WLAN provider, the billing information reflecting charges associated with the dual mode device accessing the access point of the WLAN provider. The billing code segment combines billing information from multiple WLAN providers and presents the combined information to a user of the dual mode device. The WLAN can be an 802.11 network.

In yet another aspect, a computer readable medium stores a program for enabling access to a wireless-local area network (WLAN) from a dual mode device. The program includes a WLAN detecting code segment that detects presence of a WLAN access point, as well as a cellular transmitting code segment. The cellular transmitting code segment transmits information about the access point and about the dual mode device via a cellular network to a clearinghouse server. The program also has a receiving code segment that receives the information via the cellular network, the information identifying the dual mode device and an access point of a WLAN provider. The program also has a verifying code segment, a WLAN transmission code segment, and an access code segment. The verifying code segment determines whether the dual mode device has permission to access the access point. The WLAN transmission code segment informs the WLAN provider when the dual mode device is determined to have permission to access the access point. The access code segment accesses the WLAN access point in response to the clearinghouse server approving access and forwards credentials to an operator of the access point.

The program can also include a billing code segment that receives billing information from the WLAN provider. The billing information reflects charges associated with the dual mode device accessing the access point of the WLAN provider. The billing code segment combines billing information from multiple WLAN providers and presents the combined information to a user of the dual mode device.

The cellular network can be a GSM network. The transmission can be via general packet radio service (GPRS), enhanced data rates for GSM evolution (EDGE), or universal mobile telecommunications system (UMTS) and/or short message service (SMS). The WLAN can be an 802.11 network.

In still another aspect, a system enables access to a wireless local area network (WLAN) from a dual mode device. The system has a server and a database. The server receives a query from the dual mode device via a cellular network, the query identifying the dual mode device and an access point of a WLAN provider. The server determines whether the dual mode device has permission to access the access point of the WLAN provider. The database enables the server to determine whether the dual mode device has permission to access the access point.

The database can store a list of access points that the dual mode device has permission to access. The database can be accessed by the WLAN provider to update access point information The dual mode device can be identified by a media access control address. The access point can be identified by a media access control (MAC) address, as well as a service set identifier (SSID).

Referring to FIG. 1, a description is now provided of an illustrative embodiment of a general computer system 100, on which the access control functionality can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

According to an aspect of the disclosure, global Wi-Fi roaming is supported using a cellular operator as a clearing-house for gaining access to the Wi-Fi network using dual mode devices. Users can connect to Wi-Fi access points (or hotspots) owned and operated by multiple operators without worrying about remembering multiple credentials and receiving multiple bills at the end of the billing period. The user does not have to maintain different profiles, accounts and billing relationships with a multitude of Wi-Fi operators. One-time Wi-Fi usage is also supported without giving out credit card information to the Wi-Fi operator. Although the following description frequently refers to WiFi, any type of wireless local area network (WLAN) is contemplated.

Figure 2:
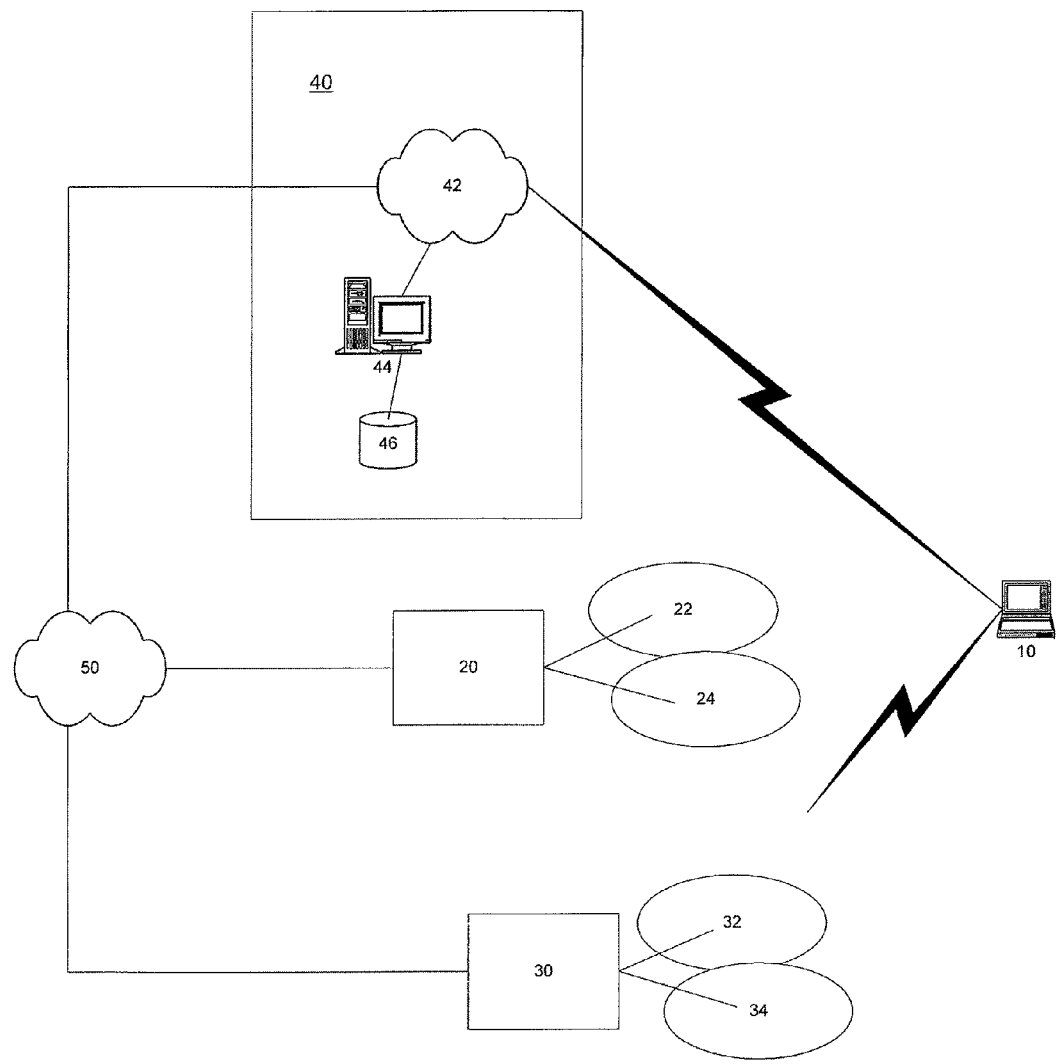
FIG. 2 shows an exemplary system including a dual mode handset, multiple wireless LANs, and a cellular network, according to an aspect of the present invention.

FIG. 2 shows an exemplary overall architecture. As shown in FIG. 2, a dual mode device 10 can connect to two different Wi-Fi operators 20, 30. Each WiFi operator is an independent Wi-Fi hotspot provider that offers WiFi services. WiFi operator 20 provides hot spots 22, 24, whereas WiFi operator 30 provides hotspots 32, 34.

A cellular infrastructure 40, e.g., a GSM provider, provides cellular service. The dual mode device user is a subscriber of the cellular infrastructure 40 and can connect to a cellular operator 42. In one embodiment, the dual mode device 10 is a laptop with a built-in WiFi radio and a cellular GPRS PCMCIA card. In another embodiment, the dual mode device 10 is a dual mode handset having both Wi-Fi and cellular radios.

Operating on the dual mode device 10 is a Global Wi-Fi Roaming Client (GWRC). One function of this client is to extract information related to Wi-Fi hotspots 22, 24, 32, 34 to which the dual mode device 10 wants to connect. The client also transmits the information to a Global Wi-Fi Roaming Server (GWRS) 44 via the cellular operator 42. In one embodiment, the client communicates to the server 44 over a data channel such as GPRS, EDGE, or UMTS. In another embodiment a short message service (SMS) is employed.

The Global Wi-Fi Roaming Server (GWRS) 44 receives queries from the client and verifies whether the dual mode device 10 is allowed access to that particular Wi-Fi hotspot 22, 24, 32, 34. The GWRS 44 also could, based upon the location of the client 10, determine whether the detected hotspots 22, 24, 32, 34 are authentic hot spots of the visited WiFi network. For example, the GWRS 44 could access a database storing coordinates of all legitimate access points of each WiFi provider and compare the location data (e.g., GPS data) of the client 10 with the database information to prevent connecting to fraudulent access points. The server 44 can interface into billing, charging, and accounting systems of the cellular provider. Another function performed by this server 44 is to communicate the credentials of the dual mode device 10 to the Wi-Fi operator 20, 30 of that particular hotspot 22, 24, 32, 34 that the dual mode device 10 wishes to communicate. In one embodiment, the credentials are forwarded to the WiFi operators 20, 30 via the Internet 50.

A Global Roaming Database (GRD) 46 may be provided in one embodiment. In this embodiment, the cellular operator 42 has a list of all allowable access points to which the dual mode device 10 is allowed to connect. As an example, the global roaming database 46 may contain a list of all the MAC addresses of different access points to which each user can connect. This database 46, although shown as part of the cellular infrastructure, may be accessed by Wi-Fi operators 20, 30 that have relationships with the cellular operator 42. As Wi-Fi operators 20, 30 upgrade their hotspot deployments, they may update the information in the global roaming database 46.

In FIG. 2 the server 44 is shown as part of the cellular operator's infrastructure. In another embodiment, a third party clearinghouse may own the server 44 and global roaming database 46.

Figure 3:
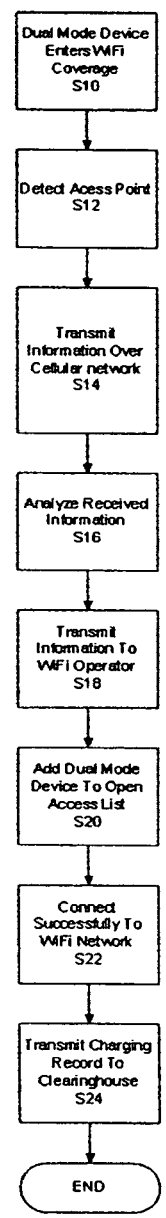
FIG. 3 show an exemplary process for accessing a wireless LAN via a cellular system, according to an aspect of the present invention.

Exemplary signaling processes will now be described with respect to FIG. 3. At step S10, the dual mode device reaches the proximity of a Wi-Fi hostpot. At step S12 the dual mode device detects a Wi-Fi signal. The Wi-Fi radio in the dual mode device detects, for example, 802.11 beacons. These beacons are part of the 802.11 standard, including 802.11b, g, and a. The dual mode device decodes the beacons transmitted by the Wi-Fi Access Point. Information transmitted in the beacon can includes the MAC address, Service Set Identifier (SSID), and security features supported (such as WEP) of the access point. By decoding the information transmitted by the access point, the dual mode device can identify the access point.

At step S14, the client collects the information received from the access point and transmits it to the cellular network. Along with the access point information, the client also transmits the MAC address (or some other identifier) of the dual mode device. In one embodiment, this transmission may be achieved by establishing a GPRS/EDGE data packet session and encapsulating the information over IP. If a packet data network is not supported by the cellular operator, the information may also be transmitted over a Short Message Service (SMS).

At step S16, the cellular operator checks whether the access point that the dual mode device wants to associate with is part of a Wi-Fi operator that the cellular operator has a relationship with. As an example, the cellular operator may look up the MAC address or the SSID of the access point and check it against the list that it has. The client is responsible for maintaining and supporting any queries made by the cellular operator regarding the hotspots.

At step S18, the server transmits the credentials (e.g., MAC addresses of the dual mode device and access point) of the dual mode device user to the appropriate Wi-Fi operator. On receiving the credentials from the cellular network, the Wi-Fi operator puts the MAC address of the dual mode device on an open access list associated with the relevant access point, at step S20.

At step 22, the dual mode device successfully connects to the Wi-Fi network. Finally, at step 24, the Wi-Fi operator sends a charging record (CDR) to the cellular operator. The cellular operator, in turn, compiles this charge with its own cellular charges and sends it out to the user at the end of the billing cycle.

As discussed above, a cellular operator enables dual mode devices to roam amongst different Wi-Fi providers. Users of the dual mode devices can connect to Wi-Fi access points owned and operated by different operators without worrying about multiple credentials and without receiving multiple bills.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A dual mode device, comprising:
    a non-transitory computer readable medium that stores a program for enabling the dual mode device to access a wireless local area network (WLAN); and
    a processor that executes the program,
    wherein the processor executes the program so that the dual mode device detects presence of a WLAN access point, transmits information about the WLAN access point and about the dual mode device via a cellular network, and not through any WLAN access point, to a clearinghouse server, and accesses the WLAN access point via the WLAN in response to the clearinghouse server approving access and forwarding credentials to an operator of the WLAN access point based on the information received by the clearinghouse server from the dual mode device via the cellular network.

2. The dual mode device of claim 1, in which the cellular network comprises a GSM network.

3. The dual mode device of claim 2, in which the information about the WLAN access point and about the dual mode device is transmitted via general packet radio service (GPRS).

4. The dual mode device of claim 2, in which the information about the WLAN access point and about the dual mode device is transmitted via enhanced data rates for GSM evolution (EDGE).

5. The dual mode device of claim 2, in which the information about the WLAN access point and about the dual mode device is transmitted via universal mobile telecommunications system (UMTS).

6. The dual mode device of claim 2, in which the information about the WLAN access point and about the dual mode device is transmitted via short message service (SMS).

7. The dual mode device of claim 2, in which the WLAN comprises an 802.11 network.

8. A computer in a cellular network, comprising:
    a non-transitory computer readable medium that stores a program for enabling access to a wireless local area network (WLAN) from a dual mode device; and
    a processor that executes the program,
    wherein the processor executes the program to receive from the dual mode device via the cellular network, and not through any WLAN access point, a query identifying the dual mode device and a WLAN access point of a WLAN provider, determine whether the dual mode device has permission to access the WLAN access point, and inform the WLAN provider when the dual mode device is determined to have permission to access the WLAN access point via the WLAN based on the query identifying the dual mode device and the WLAN access point received from the dual mode device via the cellular network.

9. The computer of claim 8, further comprising:
    wherein billing information from the WLAN provider is received and reflects charges associated with the dual mode device accessing the WLAN access point of the WLAN provider, and
    wherein the billing information from a plurality of WLAN providers is combined and presented to a user of the dual mode device.

10. The computer of claim 9, in which the WLAN comprises an 802.11 network.

11. A communications system, comprising:
    a dual mode device comprising a non-transitory computer readable medium that stores a first program for enabling the dual mode device to access a wireless local area network (WLAN), and a first processor that executes the first program; and
    a computer in a cellular network comprising a non-transitory computer readable medium that stores a second program for enabling the dual mode device to access the WLAN, and a second processor that executes the second program,
    wherein the first processor executes the first program so that the dual mode device detects presence of a WLAN access point, transmits information about the WLAN access point and about the dual mode device from the dual mode device via a cellular network, and not through any WLAN access point, to a clearinghouse server, and receives via the cellular network information identifying the dual mode device and an access point of a WLAN provider, and wherein the second processor executes the second program so that the computer determines whether the dual mode device has permission to access the WLAN access point, informs the WLAN provider when the dual mode device is determined to have permission to access the WLAN access point, and accesses the WLAN access point via the WLAN in response to the clearinghouse server approving access and forwarding credentials to an operator of the WLAN access point based on the information received by the clearinghouse server from the dual mode device via the cellular network.

12. The communications system of claim 11,
wherein billing information from the WLAN provider is received and reflects charges associated with the dual mode device accessing the WLAN access point of the WLAN provider, and
wherein billing information from a plurality of WLAN providers is combined and presented to a user of the dual mode device.

13. The communications system of claim 11, in which the cellular network comprises a GSM network.

14. The communications system of claim 13, in which the information about the WLAN access point and about the dual mode device is transmitted via general packet radio service (GPRS), enhanced data rates for GSM evolution (EDGE), or universal mobile telecommunications system (UMTS).

15. The communications system of claim 11, in which the information about the WLAN access point and about the dual mode device is transmitted via short message service (SMS).

16. The communications system of claim 11, in which the WLAN comprises an 802.11 network.

17. A system for enabling access to a wireless local area network(WLAN) from a dual mode device, comprising:
a clearinghouse server in a cellular network that receives a query from the dual mode device via the cellular network, and not through any WLAN access point, the query identifying the dual mode device and an WLAN access point of a WLAN provider, and determines whether the dual mode device has permission to access the WLAN access point of the WLAN provider; and
a database that enables the clearinghouse server to determine whether the dual mode device has permission to access the WLAN access point via the WLAN based on the query received by the clearinghouse server from the dual mode device via the cellular network.

18. The system of claim 17, in which the database further comprises a list of access points that the dual mode device has permission to access.

19. The system of claim 18, in which the database is accessed by the WLAN provider to update access point information.

20. The system of claim 17, in which the dual mode device is identified by a media access control address.

21. The system of claim 18, in which the WLAN access point is identified by a media access control (MAC) address.

22. The system of claim 21, in which the WLAN access point is further identified by a service set identifier (SSID).

\* \* \* \* \*